Nov. 24, 1970 S. F. SULLIVAN ET AL 3,542,723
METHOD OF MOLDING AGGREGATE PRESSURE RELEASE MATERIAL
Filed Aug. 21, 1968      2 Sheets-Sheet 1

INVENTORS.
SHELBY F. SULLIVAN
HARPER J. WHITEHOUSE
CARL R. JOHANSEN
BY ERVIN F. JOHNSTON
ATTORNEY.
JOHN STAN
AGENT.

3,542,723
METHOD OF MOLDING AGGREGATE PRESSURE RELEASE MATERIAL
Shelby F. Sullivan, Arcadia, Harper John Whitehouse, Hacienda Heights, and Carl R. Johansen, La Verne, Calif., assignors to the United States of America as represented by the Secretary of the Navy
Filed Aug. 21, 1968, Ser. No. 754,267
Int. Cl. C09k 3/00
U.S. Cl. 260—38                                                                   13 Claims

ABSTRACT OF THE DISCLOSURE

A process for producing a linearly elastic pressure release material for use in water containing particles of a silica in a binder. The material, if in plastic form, is molded, or if obtained in bulk form, sintered into a desired shape, and subjected to a prestress having a magnitude greater than the value of the pressures at which the pressure release material is subsequently to be used. The resulting product becomes stronger structurally than before prestressing and has its acoustic properties, such as the acoustic impedance, desensitized with depth, that is, independent of the depth of the water at which the pressure release material is to be used.

---

The invention described herein may be manufactured and used by and for the government of the United States of America for governmental purposes without the payment of any royalties thereon or therefor.

Before discussing the prior art, the term "pressure release material," which occurs often in this application, should be defined. In the field of underwater acoustics, a pressure release material is one whose acoustic impedance $Z=\rho c$ is less than that of water, where $\rho=$the density, and $c=$the acoustic propagation velocity of the material.

Prior art pressure release materials have been restricted to either gas-filled compliant tubes or laminated paper. Although such materials have served a limited purpose, as structural elements in an ocean environment they have not proved entirely satisfactory under all conditions of service. The gas-filled compliant tubes must be individually sealed, which is a time-consuming and costly operation. Laminated paper is nonlinearly elastic and it is not readily machinable.

The general purpose of this invention is to provide a method for producing a pressure release material which embraces all the advantages of similarly employed pressure release materials used in the prior art and possesses none of the aforedescribed disadvantages. To attain this, the present invention contemplates a simple process in which, in one embodiment, particles of silica in a phenolic binder are stressed uniaxially in a die, or hydrostatically, to a stress, or pressure, which exceeds the pressure at which the pressure release material is subsequently to be used. The pressure may be applied and released more than once.

An object of the present invention is to provide a method which produces a material with a characteristic impedance which is smaller than that of water.

Another object of the invention is to provide a method which produces a pressure release material for deep submergence which is castable and machinable.

Still another object is to provide a method which produces a pressure release material which has a low thermal conductivity and exceptionally high compression strength.

With these and other objects in view, as will hereinafter more fully appear, and which will be more particularly pointed out in the appended claims, reference is now made to the following description taken in connection with the accompanying drawings in which:

The invention is illustrated, but not limited, by the following specific examples of the preparation of a pressure release material of given composition. Wherever possible, alternate modes of operation are discussed, but it will be apparent that various additional modifications can be made without deviating from the scope of the invention.

The pressure release material is a composite and may be composed of various combinations of materials. Such a composition may comprise ground silica, either morphous or amorphous, homogeneously dispersed within a dry phenolic binder. The material is then put into a press with confining sidewalls, and is prestressed uniaxially to a pressure which exceeds the pressure or operating stress at which the material is later to be used.

Alternatively, if the composite material is obtained in bulk form, it may be pulverized or ground into particles of a desired size and then the mixture may be placed into a die or cavity with restraining walls and stressed to the desired pressure. This results in the pressure release material becoming a crushed mass, which retains its shape and has great compressive structural strength.

Figure 1:
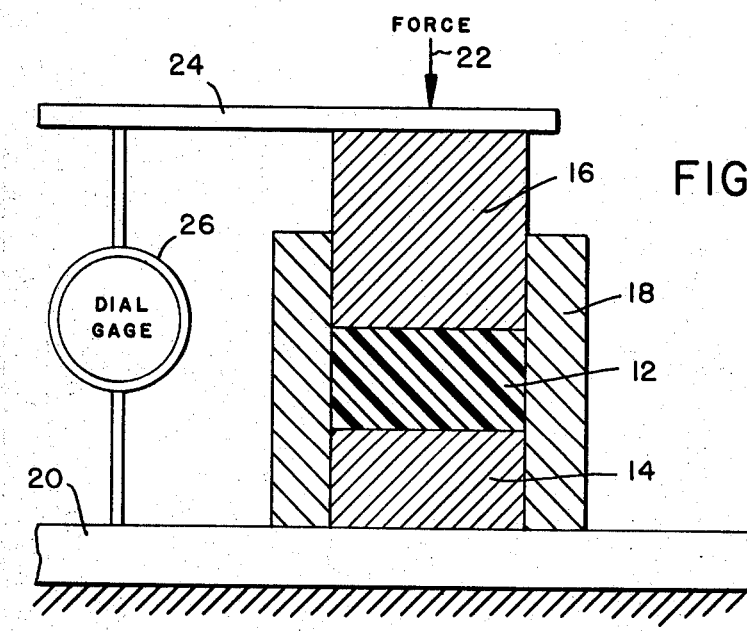
FIG. 1 shows diagrammatically one way in which uniaxial stressing can be accomplished.

Referring now to FIG. 1, there is shown a diagrammatic view showing how the pressure release material 12 is prestressed to a desired structural shape, such as a cylinder, as shown. The pressure release material 12 is placed between a lower block 14 and an upper block 16, generally called an anvil. A sleeve 18 enclosing the lower block 14, the pressure release material 12 and part of the anvil 16 insures that the material is uniaxially compressed. The lower block 14 and the sleeve 18 are placed on a base 20. The force 22 is applied by means of an upper support 24. A dial gage 26 permits determination of the exact length of the pressure release material in the direction of stress.

Figure 2:
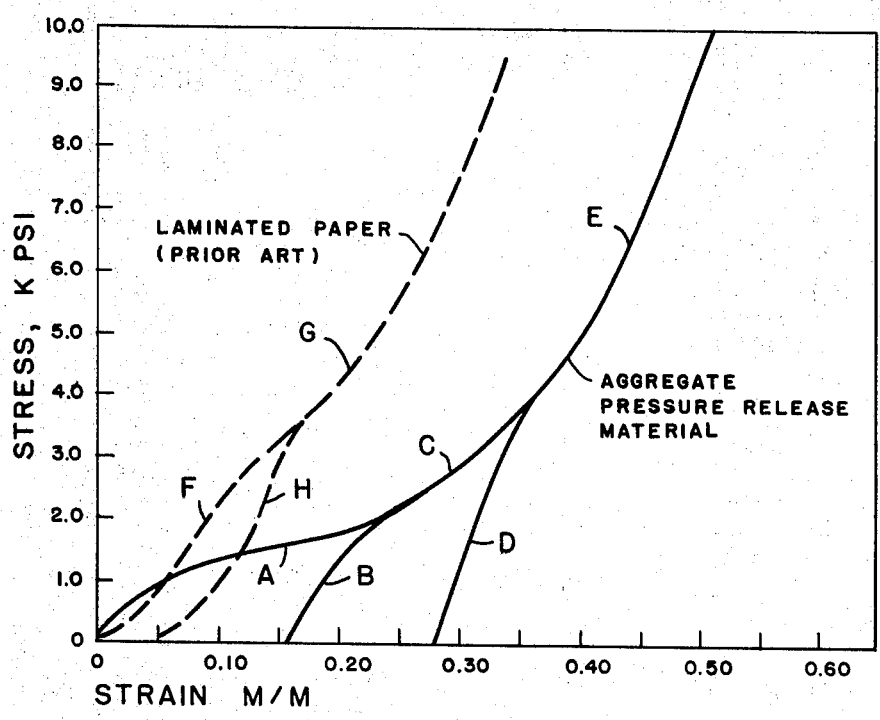
FIG. 2 is a graph showing the stress-strain relationships of a pressure release material produced by the method of this invention as well as a pressure release material of the prior art.

Referring now to FIG. 2, there are shown in broken lines stress-strain curves for a pressure release material of the prior art and in full lines stress-strain curves for the pressure release material of this invention. The abscissa values of strain are in meters per meter (m./m.), that is, dimensionless. Discussing first the stress-strain curves for the material produced by the method of this invention, curve A–C–E designates the stress-strain curve for the material with no prestressing. It can be seen that the curve is very nonlinear. As stress is applied from a zero value, the material deforms inelastically, as shown by line A. If the pressure is now released and brought back to zero, as shown in curve B, the stress-strain curve is extremely linear along the B curve from zero stress up to a value of stress just below the value of the prestress. If, now, the value of prestress is exceeded, the stress-strain curve ceases to be linear and continues its inelastic deformation along curve C and returning, as the stress is gradually reduced, along a new linearly elastic curve D. The material remains linearly elastic unless the material is inelastically stressed to a value exceeding the prior maximum value of prestress. A study of FIG. 2 for the aggregate pressure release material of this invention shows that the stress-strain curves are extremely linear up to a value just below the applied prestress.

Still referring to FIG. 2, for one of the pressure release materials of the prior art, namely, laminated paper, shown by broken lines, it can be seen that if the material is prestressed in a manner to correspond to curve F and the stress is removed in a manner corresponding to curve H, the stress-strain characteristics along curve H are not at all linear, as they are along curves B and D for the aggregate pressure release material processed according to the teachings of this invention.

It has been experimentally determined that prestressing is effective in increasing the structural strength of the material besides linearizing its acoustic properties, even when the material is used at ocean depths of 5,000 to 6,000 feet. In fact, in one application where the pressure release material processed according to this invention was used in a sonar array, the pressure release material had linear characteristics even at a depth of 10,000 feet.

Figure 3:
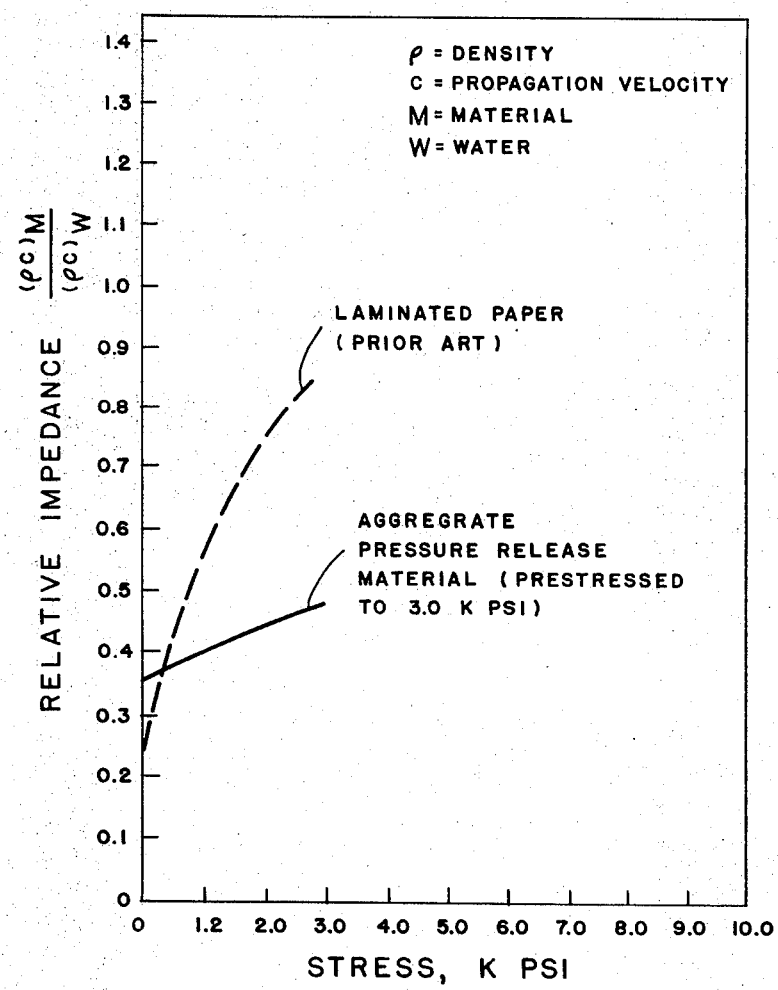
FIG. 3 is a graph showing the relative impedance of a pressure release material formed by the process of this invention as well as that of the prior art.

Referring now to FIG. 3, this figure shows that the relative acoustic impedance $(\rho c)_M/(\rho c)_W$ of the aggregate material formed as a result of the method disclosed in this invention has a magnitude much less than that of the laminated paper used in the prior art, except for comparatively small stresses. The subscript M relates to the aggregate material, while the subscript W relates to water. Moreover, it can be seen that the slope of the relative impedance as a function of the stress is much more linear and of a much smaller value for the pressure release material produced by the method of this invention as compared to the slope of the impedance of the laminated paper used as a pressure release material in the prior art.

Discussing now alternative methods, should the material comprising silica and a phenolic binder be obtained in bulk form, which requires that it be pulverized or ground first before being prestressed, it is advantageous that, before being prestressed, the powdered aggregate be first heated to a temperature of approximately 200° F. This preheating softens the phenolic binder, thus permitting the particles to flow more readily. In this manner, the prestressing may be consummated in a shorter period of time.

Alternatively, the aggregate consisting of the powdered silica and binder need not be pre-heated but the die or cavity into which the aggregate pressure release material is to be placed may be pre-heated. Generally, if the powdered aggregate is not pre-heated the prestressing must be applied for a longer period of time than when pre-heating is used.

In general, all of the embodiments of the pressure release material herein described include silica in a phenolic base. The silica may be in the form of either morphous particles, such as ground quartz, or amorphous particles, such as ground glass or fossilated silica from diatomaceous material. A wide variety of phenols have been tried and found useful.

For substances which are not isotropic, Poisson's ratio is approximately 0.25 and uniaxial stressing need not be used. For example, the pressure release material may be formed, such as by sintering into the desired shape and inserted into a fluid chamber which does not constrain the material at any point. Upon application of a pressure to the fluid in the chamber, the material would be prestressed not in a uniaxial direction, but in all directions, that is, isostatically. The isotropic material so conditioned would also have great structural strength and acoustic linearity.

Regardless of the magnitude of the stress at which the aggregate material is to be used, it is essential that the material be prestressed to a stress greater than the operating stress of the material in order to achieve linearity of operation.

One limitation as to the magnitude of prestressing which may be used is that, at extremely great pressures, the material may no longer be called a pressure release material, inasmuch as the velocity of acoustic propagation and density become greater than that of water. This limitation may occur at depths greater than 6,000 feet.

Obviously many modifications and variations of the present invention are possible in the light of the above teachings. It is therefore to be understood, that within the scope of the appended claims, the invention may be practiced otherwise than as specifically described.

What is claimed is:

1. A process for making a pressure release material having linear elastic properties and substantially linear acoustic relative impedance properties when subjected to an operating stress, comprising:
    grinding silica into finely divided particles;
    mixing the silica particles with a phenolic binder;
    forming the mixture of silica and binder into a desired structural element; and
    subjecting the structural element to an applied prestress which exceeds said operating stress to permanently deform said element and cause, upon release of said prestress, said deformed element to retain the characteristics of a linear elastic pressure release material having a substantially linear acoustic relative impedance when thereafter subjected to said operating stress.

2. A process as described in claim 1, wherein the silica is in an amorphous form.

3. A process as described in claim 2, wherein the amorphous form consists of fossilated silica.

4. A process as described in claim 2, wherein the amorphous form consists of glass.

5. A process as described in claim 1, wherein the silica is in morphous form.

6. A process as described in claim 5, wherein the morphous form is that of quartz particles.

7. A process as described in claim 1, further including the step of mixing fibers with the phenolic binder.

8. A process as described in claim 7, wherein the fibers are asbestos.

9. A process as described in claim 1, wherein heat is applied to the mixture of silica and binder during the forming step.

10. A process as described in claim 1, wherein pressure is applied to the mixture of silica and binder during the forming step.

11. A process as described in claim 1, wherein the phenolic binder is in pulverized form and the step of forming the mixture of silica and binder consists of a sintering operation.

12. A process as described in claim 1, wherein the structural element is subjected to the prestress more than once.

13. A pressure release material having linear elastic properties and substantially linear acoustic relative impedance properties when prepared in accordance with the steps as set out in claim 1.

References Cited

UNITED STATES PATENTS

| | | | |
|---|---|---|---|
| 731,608 | 6/1903 | Owen | 264—122 |
| Re. 21,252 | 10/1939 | Kistler | 264—122 |
| 3,450,808 | 6/1969 | Roberts | 264—120 |

ROBERT F. WHITE, Primary Examiner

J. R. HALL, Assistant Examiner

U.S. Cl. X.R.
264—120, 122